Patented June 7, 1932

1,862,037

UNITED STATES PATENT OFFICE

ERNST SCHLENKER, OF BERLIN, GERMANY

PROCESS FOR THE SEPARATION OF LIQUID AND SOLID FATTY ACIDS

No Drawing. Application filed December 16, 1930, Serial No. 502,846, and in Germany December 4, 1929.

Natural fats are mixtures of various fatty acids, that is, of their glycerides. A separation is often desirable, for technical purposes, for example when a portion of the fatty acids in a fat is solid at ordinary temperature while another portion is liquid. Thus, bone fat, tallow, palm oil, etc., are separable into solid stearine and liquid olein. The customary method of working consists substantially in subjecting the fatty-acid mixture, which has been formed into cakes, to hydraulic pressure. This method, however, is cumbrous and expensive, and, being generally known, needs no further description.

It has now been ascertained that the separation can be effected in a simple manner by treating a solution of neutral fats, or their fatty acids, in alcohol or acetone or some other suitable solvent, with the hydroxides or oxides of two different metals, or alkaline-earth metals and alkali metals, simultaneously or in succession, in such a manner as to form soluble and insoluble fatty-acid salts, which are then separated by filtration. Since, as a rule, the liquid fatty acids are differently constituted than the solid acids, both their conditions of solubility and their acidity are also different. Consequently, by adopting a suitable method of working, it is possible to obtain a mixture of different metallic salts, in which the solid fatty acids are combined with other metals than those with which the liquid fatty acids are combined, so that, as the result of the different solubilities of these two kinds of salts in the medium, the separation can be effected by simple filtration.

The composition of the saponifying agent naturally depends on the composition of the fatty mixture to be separated, namely on the proportion (to be ascertained in advance) in which the solid and the liquid fatty acids are present therein. Thus, if stress be laid on complete separation, the amount of lime specified in the following example must be increased, and that of the soda lye correspondingly diminished, when tallow is taken in place of bone fat, because experience has shown that tallow contains a larger amount of solid fatty acids than bone fat.

The fatty acids are again set at liberty by the subsequent treatment of the separated salts with mineral acids.

Example 250 grms. of bone fat are heated in a spherical flask for three hours, under a reflux condenser, with 238 cc. of alcohol, 22.75 grms. of calcium hydroxide (from marble) containing 74% of lime, 31.5 cc. of a 40% solution of caustic soda and 47 cc. of water. After cooling down to 55–50° C., the solution is filtered off, in an aspirator, from the precipitated salts of the solid acids. The residue is again extracted with boiling alcohol and filtered in the same manner. The clear filtrate is treated with one-third its volume of water, and acidified with sufficient sulphuric acid to impart an acid reaction to the sub-lye. The olein and sub-lye are separated from each other, the olein being then boiled up with water and separated from the latter in known manner. Similarly, the residue from the filtrate is suspended in water, and acidified with mineral acid, in liquid or gaseous form (such as HCl gas), and boiled. The solid fatty acids are separated from the water in known manner.

The present method must not be confounded with analytical methods for the separation of lower fatty acids from higher acids on the basis of completely transforming the fatty acids contained in a mixture into metallic salts, and then effecting the separation in a solvent depending on the nature of the metallic salts obtained. For example, the method of Farnsteiner (see for example, Holde's work on Hydrocarbon Oils and Fat. —"Kohlenwasserstofföle und Fett"—1924, pp. 524–528) utilizes the fact that the lead salts of saturated fatty acids (such as stearic acid) are insoluble in ether, whereas lead oleate is soluble. The thallium salt method (Ibid. p. 527) for the same purpose, is based on the solubility or insolubility of the thallium salts in alcohol of a certain concentration, etc. It is characteristic of all these methods—many other examples of which could be cited—that the fatty acids present are transformed into a single salt, such as that of lead, thallium, etc. The preparation of this salt is effected in the usual manner, so that, in the first place, the readily soluble alkali salts are produced from neutral fats or their fatty acids, and then, by means of suitable metallic compounds, in excess, or at least in equivalent amounts, the metallic salts of the fatty acids are recovered.

The process according to the present invention, however, operates in such a manner that two different salts are formed in the selected solvent, and, as already mentioned, produces this result in that only such quantities of each salt- (soap-) forming metallic compound are employed as would be insufficient for complete saponification if employed alone.

I claim:—

Process for the separation of liquid and solid fatty acids by filtration, consisting in treating fats, or their fatty acids, dissolved in a solvent (such as acetone, alcohol or the like) with two different saponifying agents one furnishing respectively a salt insoluble and a salt soluble in said medium, separating the insoluble and soluble soaps jointly produced in said medium, and retransforming them into the fatty acids by decomposition with mineral acids.

In testimony whereof I affix my signature.

ERNST SCHLENKER.